(12) United States Patent
Maitre

(10) Patent No.: US 7,971,447 B2
(45) Date of Patent: Jul. 5, 2011

(54) CONTROL PARAMETERS FOR A HIGH VOLTAGE BATTERY COOLING STRATEGY

(75) Inventor: Jerome Maitre, Royal Oak, MI (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 292 days.

(21) Appl. No.: 12/163,080

(22) Filed: Jun. 27, 2008

(65) Prior Publication Data

US 2009/0321532 A1    Dec. 31, 2009

(51) Int. Cl.
*F25D 23/12* (2006.01)
*F28D 15/00* (2006.01)
*H01M 10/50* (2006.01)

(52) U.S. Cl. ............. 62/259.2; 165/104.11; 165/104.33; 429/62

(58) Field of Classification Search ................. 62/259.2, 62/185; 429/120, 62; 165/104.11, 104.33; 236/91 R
See application file for complete search history.

(56) References Cited

U.S. PATENT DOCUMENTS

| | | | |
|---|---|---|---|
| 7,143,724 B2 * | 12/2006 | Hashizumi et al. | 123/41.56 |
| 2002/0184908 A1 * | 12/2002 | Brotz et al. | 62/259.2 |
| 2006/0060340 A1 * | 3/2006 | Busse et al. | 165/202 |
| 2007/0157647 A1 * | 7/2007 | Duhme et al. | 62/196.4 |

FOREIGN PATENT DOCUMENTS

WO    WO 2006010487 A1 *    2/2006

\* cited by examiner

*Primary Examiner* — Chen-Wen Jiang
(74) *Attorney, Agent, or Firm* — Crowell & Moring LLP

(57) ABSTRACT

A cooling system for a vehicle battery is described. The system has a cooling loop in heat transfer communication with the battery, for removing heat therefrom with a coolant, a first cooling device selectively coupleable to the cooling loop, using a refrigerant fluid to transfer heat with the coolant, and a second cooling device selectively coupleable to the cooling loop, using ambient air to transfer heat with the coolant. Various temperature sensors for sensing an ambient temperature and a battery temperature are provided, and connected to a controller that implements a coolant flow bypass function by commanding operation of a valve to bypass the selected one of the cooling devices in response to the battery and the ambient temperatures.

12 Claims, 1 Drawing Sheet

CONTROL PARAMETERS FOR A HIGH VOLTAGE BATTERY COOLING STRATEGY

BACKGROUND AND SUMMARY OF THE INVENTION

Hybrid vehicles use electric motors alimented by one or more batteries to supplement the propulsion provided by a main motor, such as an internal combustion engine. Electric vehicles also require high performance batteries for propulsion and to power accessories. High performance batteries, however, generate a large amount of heat as a byproduct of the generation of electricity. The heat has to be removed, to retain the performance of the battery and to prevent damage due to overheating, and also to prevent a possible fire hazard to the vehicle.

It is also important when using high performance, high voltage (HV) batteries to maintain a uniform temperature of the battery. The batteries are typically formed by packs of multiple cells, tied together physically and electrically to provide a compact and powerful source of electricity. Under certain circumstances, some of the cells may produce more heat than their neighboring cells, so that the cooling scheme used for the battery has to homogenize the temperature profile for all the cells in the battery. In other cases, the environment of some cells causes more heating and/or reduced cooling.

Current batteries used in many hybrid, conventional and electric vehicles are of the nickel-metal hydride (NiMH) type, which provides a good amount of stored power for the size and weight of the battery. These batteries also generate enough heat that a cooling scheme is necessary to maintain them at an acceptable operating temperature while being used in different environmental conditions, and being subjected to various demands. Other types of batteries, however, may also be used. For example, a promising new type of battery for hybrid power plants is the lithium ion battery, which provides more power for a given size and weight of the battery. Other battery technologies also have been or are in the process of being developed because of the great interest in vehicles due to environmental and fuel cost concerns. These batteries with higher power concentration, or other electricity storage and/or production components, may require even more cooling to maintain a uniform operating temperature, and to prevent unsafe conditions.

The exemplary embodiments of the present invention provide a cooling scheme or strategy which ensures that the heat generated by the battery during its operation is removed. The battery's cells remain at a constant and uniform temperature, close to an ideal temperature for the efficient operation of the battery, and which prevents dangerous overheating conditions of the battery that can lead to fire and other damage.

The high voltage battery according to exemplary embodiments of the invention is cooled with a coolant flowing at a high flow rate, to ensure a homogeneous cooling of all the cells in the battery pack. The high flow rate promotes a homogeneous temperature profile for the cells.

The heat transfer from the battery, thus the cooling of the battery cells, is a function of the temperature gradient between the battery cells and the coolant. A maximum temperature gradient for a give system is selected, which results in a limit to the maximum cooling of the battery cells. This precaution avoids thermal shocks and the resulting high stresses that can damage or destroy the battery if it is cooled too fast.

According to one exemplary embodiment of the invention, a battery cooling loop is provided to cool the battery cells with a liquid coolant. For example, the coolant may be a glycol-based coolant similar to the coolant used in the vehicle's engine cooling system. Other suitable cooling fluids may be used for this function, as would be understood by one of skill in the art. Preferably, the cooling loop for the battery cells is separate from the cooling system of the vehicle's engine (i.e. the internal combustion engine). However, in other exemplary embodiments, the same coolant may be circulated for cooling both the engine and the battery.

The coolant in the battery loop may in turn be cooled by being directed into one or more additional loops, each loop containing different cooling devices. For example, a first cooling device such as a refrigerant/coolant heat exchanger (also referred to as a chiller) may be used to control the temperature of the coolant in the battery's high flow rate cooling loop. In one example, R134 refrigerant may be used through the chiller to cool the coolant.

A second cooling loop may be provided, for example containing a second cooling device such as an air/coolant heat exchanger (HE) which uses ambient air to control the coolant temperature of the battery's high flow rate cooling loop. The HE may be placed in such a position that outside ambient air is forced through the HE when the vehicle moves.

In an embodiment according to the invention, both of the loops may be used to remove heat from the battery coolant loop. A valve or other selector device may be used to determine whether the two loops are operated separately or simultaneously. For example, a duo-valve may be used to direct the coolant flow from the battery coolant loop to transfer heat using the chiller loop, the HE loop, or a combination of the two. The duo-valve may include a simple on-off valve, or may have a proportional valve, allowing a graduated division, or bypass, of the coolant between the two cooling loops.

A problem occurs when it is necessary to change the amount of heat transferred from the batteries of the hybrid vehicle. The flow rate of the coolant flowing in the battery cooling loop typically cannot be changed, because a high flow rate is necessary to maintain a homogeneous temperature of all the battery cells. The inability to change the battery coolant loop's flow rate may result, under certain circumstances, in a high temperature gradient between the battery and the coolant, which can result in damage to the device.

In addition, other difficulties exist in regulating the cooling rate of the battery. To simplify the design and construction of the cooling system, the chiller disposed in the refrigerant loop may be connected to the air conditioning system which provides cooling to the passenger cabin. The exemplary chiller thus operates in parallel or in series with the vehicle AC system, using the same working fluid. Conventionally, the cooling capacity of the refrigerant coolant loop is controlled by regulating the refrigerant flow rate, using a thermostatic valve and/or with an on/off valve. However, changing the flow rate of the refrigerant results in a degradation of the performance of the AC system, which is felt by the passengers as uncommanded temperature variations. The durability of the valves also suffers from the additional use to control battery cooling. Neither of these effects are acceptable when designing the battery cooling system.

The cooling capacity of the HE cooling loop is greatly influenced by the amount and temperature of the outside air passing through the heat exchanger, since the HE is generally positioned on the vehicle so that ambient air flows over it when moving. Thus, lower ambient temperatures and higher speeds of the vehicle result in a much enhanced ability of the HE to cool the battery coolant. These parameters are outside of the control of the battery cooling system, and thus not only can't be used to optimize the battery cooling, but may interfere with what the control system is attempting to achieve, for example by cooling the battery too fast.

According to the embodiments of the present invention, a control system is used to affect the battery cooling using logic that varies the bypass, which is the division of how much coolant fluid is directed to the chiller using the refrigerant cooling loop, and how much is directed to the HE using the outside air for cooling. According to the invention, one of the cooling devices is used as a primary cooling device for the coolant, and the other forms a bypass loop, which is more or less used depending on the system's conditions. This arrangement prevents over cooling of the batteries which can result from too high a temperature gradient between the coolant in the high flow rate cooling loop and the battery cells. It also prevents negatively affecting passenger comfort by impairing the operation of the air conditioning system, and reducing the life of conventional air conditioning components.

The operation of an exemplary embodiment of the invention is more clearly illustrated using two examples. In a first example, low exterior air temperature is present. The exemplary exterior ambient temperature is −25° C., and the battery temperature is a temperature requiring it to be cooled. Initially the battery is cooled by the HE coolant loop, since the ambient temperature is low, and all of the coolant flows over the HE which is cooled by ambient air. The chiller of the refrigerant loop is deactivated, so that there is no refrigerant flowing therethrough. Under these conditions, the HE loop with ambient air cooling is primary, and the deactivated chiller loop is used as a bypass. A coolant pump is kept on in all cases, to maintain the necessary high coolant flow rate over the battery cells.

Because of the low ambient temperature, the cooling rate over the HE is very strong, and the coolant temperature rapidly drops to a low value, at which point the temperature delta between the coolant and the battery reaches a predetermined gradient limit. This gradient limit value may be selected as the maximum allowable temperature gradient, activating the bypass function according to the invention to prevent the temperature gradient from further increasing. The bypass function logic causes opening of the duo-valve allowing the coolant to flow over both the primary HE loop and the bypass chiller loop. Because the chiller is deactivated, the refrigerant therein is not producing a cooling effect. By bypassing some of the coolant to the deactivated chiller loop, the maximum allowable temperature gradient is not exceeded.

In a second example, the exterior ambient temperature is high, for example 15° C. The battery temperature starts at a temperature necessitating cooling. In this case, the chiller is activated, and the coolant pump is on. The chiller loop with the flowing refrigerant is primary in this case, and the HE loop is used as a bypass. After some time in operation, the chiller reduces the coolant temperature to a low value, so that the temperature delta between coolant and battery cells reaches the maximum allowable temperature gradient, in this exemplary case a predefined gradient limit beyond which damage may occur. To prevent excessive cooling, the bypass function is activated, and opens the duo-valve so that the coolant flows both in the primary chiller loop and the bypass HE loop.

In both examples of the system's operation the duo valve can be controlled by an electronic control unit which monitors temperatures and/or bypass flow rate in the system to maintain the desired temperature gradient. Those of skill in the art will understand that other types of control mechanisms may be used. For example, mechanical rather than electronic controls may be used, and simpler, less expensive devices such as thermostatically actuated valves may be used to obtain some of the benefits of the invention.

As indicated above, the bypass may simply include switching from one cooling loop to the other, and back as necessary, with substantially all of the coolant flowing in one of the loops at a time, as directed by the control unit. Alternatively, a selected fraction of the coolant may flow in one of the loops, and the remainder in the other loop at the same time, to control the coolant temperature and maintain the temperature gradient within desired limits. If bypassing only a portion of the coolant flow is not sufficient to control the temperature gradient, the entire coolant flow can be bypassed to the other loop.

The bypass control logic may use temperatures within the cooling system and the environment to determine which loop, or if both loops are to be used for transferring heat from the coolant. However, the temperature within each of the loops may be affected by hot (or cold) adjacent vehicle components, and by the outside environment temperature. This can result in errors by the control logic, because of inaccurate temperature sensing. These conditions are especially of concern when the fluid in an unused loop is at rest. To counter this problem, the present invention provides for utilizing the temperature gradient between the battery and the outside environment to determine which loop is used, i.e. how the bypass function operates.

Other objects, advantages and novel features of the present invention will become apparent from the following detailed description of the invention when considered in conjunction with the accompanying drawing.

BRIEF DESCRIPTION OF THE DRAWING

The present invention is described in the following with reference to the single drawing listed below. In the drawing.

DETAILED DESCRIPTION OF THE DRAWING

Figure 1:
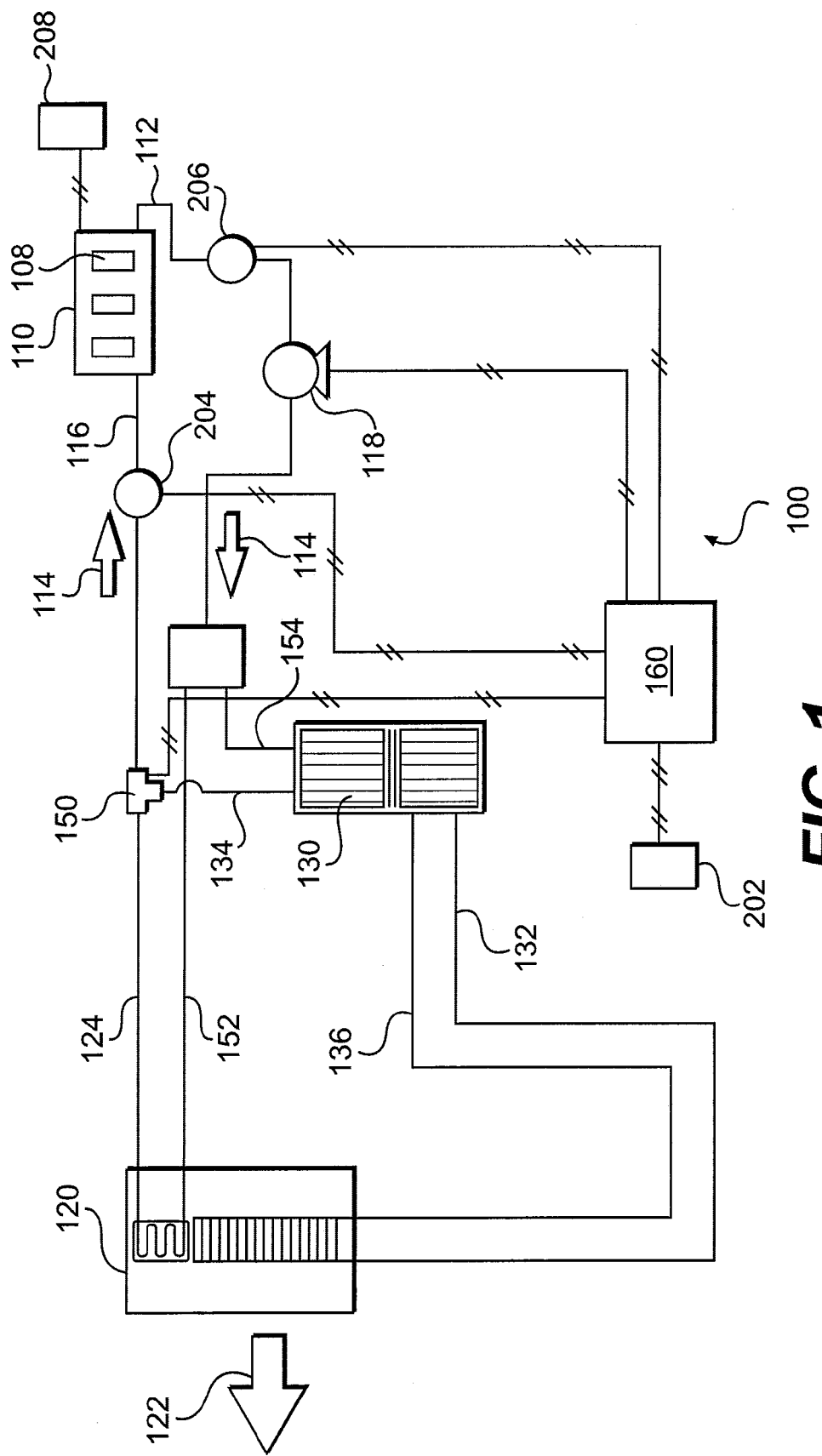
FIG. 1 is a schematic diagram showing an exemplary embodiment of the battery cooling system according to the invention.

An exemplary embodiment of a battery cooling system according to the invention is shown in FIG. 1. In this embodiment, a battery 110 includes multiple cells 108 that are cooled using a cooling system 100. The battery 110 may be, for example, part of a hybrid power plant system of a vehicle, and may be operatively connected to the vehicle's electrical power delivery network provide and store electrical energy as needed. Those of skill in the art will understand that instead or in addition to a battery 110, other elements adapted for storing and/or generating electricity and which require cooling may be used according to the invention. These may include, for example, capacitors, fuel cells, etc.

A coolant 114 is used to cool the cells 108 of the battery 110. Coolant 114 is circulated, for example, by a pump 118. In an exemplary embodiment, the coolant 114 may be automotive coolant, such as a glycol based fluid. As described above, the flow rate of the coolant is kept constant at a high value, to ensure a uniform and homogeneous temperature of the battery cells 108.

The cooling efficiency of the system depends on the coolant flow rate and the temperature gradient between the battery cells 108 and the coolant 114. The greater the gradient, the greater the heat transfer. However, an excessive temperature gradient may cool the battery too fast, and may cause damage or failure of the battery 110. To prevent such damage the system according to the invention operates to maintain a preselected maximum temperature gradient between the cells and the coolant.

To achieve this performance, the present exemplary system uses a duo-valve 150 connected to the outlet conduit 112, which is controllable to direct the flow of coolant 114 towards the ambient air heat exchanger HE 120, towards the refrigerant-cooled chiller 130, or both. The duo-valve 150 may be operated by an electronic controller 160, or other control system able to respond to temperatures in the environment and in the cooling system 100.

A conduit 152 connects the duo-valve 150 to the HE 120, in which heat is removed from the coolant 114 by passing a flow of ambient air 122 therethrough. The cooled fluid is then returned to the battery 110 via return lines 124, 116. The HE 120 is preferably mounted at a location on the vehicle where it is exposed to the stream of air induced by movement of the vehicle. Its cooling efficiency is thus greatly affected by the ambient temperature and the speed of the vehicle.

In one exemplary embodiment, the duo-valve 150 includes two solenoids, each controlling a valve, that regulate the coolant flow towards either the chiller loop or the HE loop. The solenoids may be under control of the control unit 160, which executes logical instructions to carry out the bypass function in response to temperatures sensed in the battery and the ambient air. The speed of the vehicle may be an additional input parameter for the control unit 160. However, as described above, the operation of the duo-valve 150 to carry out the bypass function may be simplified, and may be simply based on temperature activated valves, without the need for an electronic control unit.

According to the exemplary embodiments of the invention, the amount of cooling applied to the coolant loop going to the battery, and thus the temperature gradient applied to the battery cells, may be controlled by the bypass function, which directs the flow of coolant to one or both the HE loop and the chiller loop. The bypass is selected by evaluating, for example, the sensed temperatures of the ambient air, the battery and the coolant in contact with the battery. Additional parameters may be also considered in more complex embodiments of the bypass function.

To carry out the bypass function, the control unit 160 is connected to various temperature determining components, such as sensors disposed in the vehicle, and in particular in the cooling system 100. For example, temperature sensor 202 measures the ambient temperature outside the vehicle. Temperature sensor 204 measures the inlet temperature of the coolant prior to entering the battery compartment, and sensor 206 measures it after exiting the battery compartment. The temperature within the battery compartment may be measured by a sensor 208. In a different embodiment, the temperature determining components may use a computational method to determine at least some of the temperatures. For example, a numerical or theoretical model of the system may be used to calculate selected temperatures.

Because the efficiency of the heat transfer from the battery is directly proportional to the temperature gradient between the battery cells and the coolant, the operation of the bypass function may be controlled in response to the measured battery and/or coolant fluid temperatures. For example, the temperatures measured by sensor 208 at the battery, and sensors 204, 206 in the coolant flow may be used.

In conditions where the two or more cooling loops are activated independently of one another, the situation may occur that the inactive loop is unused for an extended period of time during which the fluid therein becomes stagnant. For example, if the chiller loop is not used, the refrigerant fluid may stagnate for a period of time. Coolant associated with the unused loop may also become stagnant. The temperature of the coolant in the unused loop can be affected by external conditions. For example, hot or cold ambient temperatures may affect the coolant, and extraneous vehicle components such as hot exhaust pipes, cold air conditioning chillers and the like also may influence the fluid's temperature.

When the loop is activated again, the coolant therein flows through the rest of the cooling system 100, and can cause erroneous or inconsistent operation of the bypass function by the control units 160, because of the artificially too high or too low temperature of the coolant measured by the sensors.

The following example illustrates problems which may occur if the temperature of the coolant fluid is used to control operation of the bypass function. In a situation where the external ambient temperature is 10° C. and the battery temperature is 50° C., all the coolant initially flows through the cooling loop with the air cooled HE 120 because of the low ambient temperature. The coolant in the loop with the chiller 130 is stagnant, and is warmed by the hot vehicle components that may be located nearby. For example, portions of the exhaust pipe or of the engine itself may be near the chiller 130. As the battery 110 cools down, the temperature of the coolant also is lowered, and if that temperature is used to control the bypass logic, the control unit may order a switch to the loop with the chiller 130. However, as the chiller loop is activated, the warm stagnant coolant therein flows over the temperature sensors (for example sensors 204, 206), generating an erroneously high temperature signal. At least for a time, the control unit will receive high temperature values for the coolant, and as a result will switch back to using the HE loop only to transfer heat from the coolant.

To prevent this erroneous operation of the bypass logic by the control unit, it is preferable to use parameters other than the coolant temperature as an input. According to exemplary embodiments of the invention, the temperatures of the battery module and of the ambient air are used to control the bypass function. The battery module temperature and the ambient temperature are both stable, and thus do not pose the risk of transient errors that can occur from using the coolant temperature. Accordingly, a more stable and predictable operation of the bypass function is possible. In particular, the temperature delta, or gradient, between the battery module and the ambient may be used to control the operation of the bypass.

Knowing the efficiency of the two exemplary cooling loops for a given pair of ambient temperature and battery temperature allows optimizing the heat transfer from the coolant, and thus cooling of the battery, by selecting operation of the chiller loop, the HE loop, or a combination of both loops. Although the system may be set up to optimize the maximum cooling capacity of the coolant, those of skill in the art will understand that other results may be emphasized. For example, the most energy efficient mode of operation may be obtained, such as by using the HE cooling loop as much as possible, since that mode of operation does not require the additional energy used to compress and move the refrigerant working fluid used in the chiller loop. In one example, a low ambient temperature would favor using the HE loop over the chiller loop, since the former would more efficiently cool the coolant fluid.

In addition to the ambient and battery temperatures, parameters such as vehicle speed and cooling fan speed may also be used in determining the operation of the bypass function. In general, these parameters are useful in better determining the efficiency of the HE cooling loop, which can then be applied in determining the desired bypass.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cooling system for a vehicle battery, comprising:
   a cooling loop in heat transfer communication with the battery, for removing heat therefrom with a coolant;
   a first cooling device selectively coupleable to the cooling loop, using a refrigerant fluid to transfer heat with the coolant;
   a second cooling device selectively coupleable to the cooling loop, using ambient air to transfer heat with the coolant;
   temperature determining components for determining an ambient temperature and a battery temperature;
   a valve for directing the coolant to at least a selected one of the first and second cooling devices; and
   a controller for implementing a coolant flow bypass function to limit a temperature gradient between the coolant and the battery to a selected threshold by commanding operation of the valve to bypass the selected one of the cooling devices in response to at least one of the battery temperature and the ambient temperature, wherein the selected threshold is a gradient beyond which damage to the battery is possible.

2. The cooling system according to claim 1, wherein the controller commands operation of the valve as a function of a temperature gradient between the battery temperature and the ambient temperature.

3. The cooling system according to claim 1, wherein the first cooling loop comprises a chiller.

4. The cooling system according to claim 1, wherein locations of the battery temperature sensor and the ambient air temperature sensor are selected to sense stable temperature values.

5. The cooling system according to claim 1, wherein the controller applies the flow bypass function to maximize a cooling capacity of the cooling system.

6. The cooling system according to claim 1, wherein the controller applies the flow bypass function to maximize efficiency of the cooling system.

7. The cooling system according to claim 1, wherein the temperature determining components comprise temperature sensors.

8. A method of cooling a vehicle battery, comprising the acts of:
   determining at least one of an ambient temperature and a battery temperature;
   determining in a controller, based on the sensed temperatures, directing a flow of a battery coolant to at least one of a refrigerant cooling device and an ambient air cooling device, for transferring heat with the coolant;
   commanding a valve to direct the flow of coolant as determined by the controller to maintain a desired battery cooling performance; and
   based on a gradient between the battery temperature and the ambient temperature, commanding the valve to direct a portion of the coolant flow to bypass the selected one of the cooling devices, and instead flow to the other one of the cooling devices, in order to limit a temperature gradient between the battery temperature and a temperature of the battery coolant; and
   maintaining the desired battery cooling performance by maintaining the temperature gradient below a battery gradient threshold beyond which damage to the battery is possible.

9. The method according to claim 8, further comprising maintaining the desired cooling performance by maximizing cooling efficiency of the battery.

10. The method according to claim 9, further comprising preferentially directing the coolant flow to the ambient air cooling device.

11. The method according to claim 8, further comprising receiving in the controller temperature signals unaffected by extraneous vehicle components.

12. The method according to claim 8, further comprising determining the temperatures by one of measuring with a sensor and using a numerical model.

\* \* \* \* \*